UNITED STATES PATENT OFFICE 2,591,572

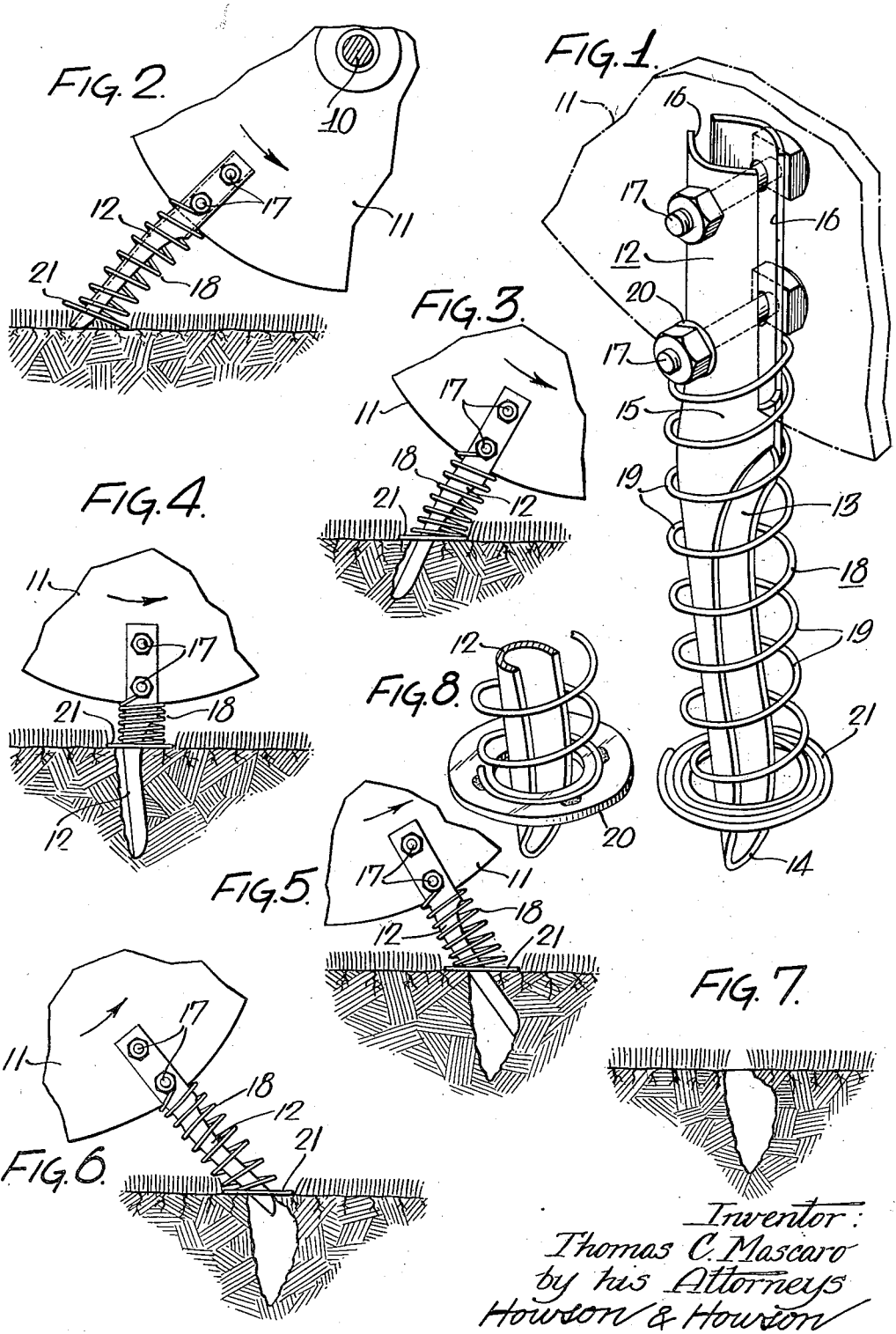

TURF ENGAGING ELEMENT FOR CULTIVATING APPARATUS

Thomas C. Mascaro, West Point, Pa., assignor of one-half to Anthony Mascaro, West Point, Pa.

Application November 18, 1949, Serial No. 128,085

5 Claims. (Cl. 97—52)

This invention relates to new and useful improvements in cultivating devices. More particularly, the invention relates to cultivating apparatus embodying devices designed to penetrate and loosen and aerate the soil about the roots of grass turf with a minimum of disturbance to the surface grass, and is a continuation-in-part of my co-pending application Serial No. 778,775, filed October 9, 1947, now Patent No. 2,580,236, dated December 25, 1951.

In my aforesaid application there is disclosed apparatus for aerating and treating grass turf including a frame which supports a rotating shaft on which are mounted a plurality of circular disk elements each carrying a plurality of turf-engaging spoons arranged substantially radially of the disks at equally spaced intervals circumferentially thereof. These spoons are constructed and operate, in the manner set forth in the aforesaid application, to engage and penetrate the turf and then move progressively rearwardly in a generally arcuate sweep, being finally withdrawn from the turf substantially at the point of original entry and carrying with them an elongated generally cylindrical mass or plug of the soil thus leaving an opening in the turf.

In certain instances and more particularly in the case of turf having relatively shallow grass root structure as well as in cases of especially moist turf following heavy rains, the lifting action or force of the spoons as they emerge from the ground may tend to tear loose and raise the surface layer of the turf, for example, in the manner of a mat or blanket. This action is undesirable of course and in accordance with the present invention novel means is provided to bear or engage upon the surface of the turf adjacent each spoon to thereby prevent a surface layer or portion of the turf from being torn loose and lifted or raised upwardly as described.

With the foregoing in mind, the principal object of the present invention is to provide means in conjunction with the turf-engaging spoons of cultivating apparatus novel means for engaging upon the surface of the turf adjacent the penetration thereof by the spoons to prevent the turf from being torn loose and lifted or raised upwardly as set forth.

Another object of the invention is to provide novel means as set forth which may be attached to each of the ground-engaging spoons of the apparatus.

Another object of the invention is to provide in conjunction with the ground-engaging spoons of cultivating apparatus novel means which operates effectively to prevent the turf from being torn loose by the action of the spoons without in any way interfering or lessening the cultivating action of the spoons upon the turf.

A further object of the present invention is to provide in conjunction with turf-engaging spoons of the character described novel means for preventing lifting and tearing loose of the turf which is operable also to break up and crumble the small masses or plugs of soil removed from the turf by the spoons.

A still further object of the invention is to provide novel ground-engaging means having the characteristics and advantages set forth which is of relatively simplified and inexpensive construction and highly efficient and effective in operation and use.

These and other objects of the invention and the various features and details of the construction and operation thereof are hereinafter fully set forth and described in the accompanying drawing, in which:

Fig. 1 is a view in perspective of a turf-engaging spoon of a cultivating apparatus incorporating or embodying novel ground-engaging means made according to the present invention for preventing the tearing loose and lifting of the turf adjacent the penetration thereof by the spoon;

Figs. 2 to 7, inclusive, comprise a series of fragmentary elevational views partially in section showing the operation of the cultivating spoons and the associated turf-retaining devices made in accordance with the present invention; and Fig. 8 is a fragmentary view in perspective illustrating a modified construction of the ground-retaining devices.

As previously set forth there is disclosed in my co-pending application aforesaid, cultivating apparatus in the general form of a wheeled carriage adapted to traverse turf to be cultivated and including a frame structure in which is rotatably journaled the opposite ends of a shaft 10 that extends transversely and horizontally of the cultivating apparatus. Mounted for free rotation upon this shaft 10 are a plurality of circular disk elements 11 which are arranged upon the shaft 10 in predetermined equally spaced relation axially thereof. Substantially secured upon each of the circular disk elements 11 and adapted for rotation therewith about the shaft 10 is a plurality of turf-engaging elements or spoons, generally designated by reference numeral 12, and arranged substantially radially of the disks 11 at equally spaced intervals circumferentially thereof.

With reference particularly to the construction and arrangement of the spoons 12, the turf-engaging portion 13 thereof is elongated and of substantially concave-convex construction having a uniform substantially semi-circular cross-sectional configuration throughout the length thereof, as shown in Fig. 1 of the drawing, with its free end rounded as indicated at 14. At the inner end the semi-circular portion 13 of the spoons 12 terminates in tubular portions 15 which may be slotted diametrically as indicated at 16 to receive the peripheral edge portion of the circular disks 11 to which the spoons 12 are secured, for example, by nuts and bolts or other fasteners 17.

The spoons 12 are mounted in such manner that the semi-circular portions 13 thereof engage the turf with the convex face of the semi-circular portion facing in the direction of travel of the apparatus and with the concave face thereof in trailing relation with respect to direction of travel of the apparatus, for example, as indicated most clearly in Figs. 2 to 7 of the drawing. Essentially, therefore, the diametrically extending slot 16 provided in the tubular mounting portion 15 of the spoon 12 lies in a plane normal to the plane of the trailing edges of the turf-engaging concave-convex portion 13 of said elements.

The several spoons 12 are mounted upon the circular disks 11 with their tubular portions 15 positioned radially with respect to the rotational axis of the shaft 10, and it is to be noted that the turf-engaging portions 13 thereof are disposed at an angle to the tubular mounting portion 15 so that said portions 13 are positioned at an angle to the radius from the axis of rotation of the disks 10 whereby the said portions 13 lead slightly in the direction of rotation of the circular disks 11 as indicated by the arrows on the several figures of the drawing.

In accordance with the present invention there is provided in or for association with each spoon 12 of the cultivating apparatus novel means which is constructed to engage upon the surface of the turf immediately adjacent the point of penetration thereof by the spoon portion 13 and prevent the spoons from tearing loose and lifting upwardly the turf, and particularly in the instances of shallow grass root structure and excessively moist turf as previously described. In the present instance the turf-engaging and retaining device consists of a coil spring, generally designated 18, having in the static condition thereof shown in Fig. 1 of the drawing, a plurality of relatively uniformly spaced coils or convolutions 19 of substantially uniform diameter surrounding the turf-engaging portion 13 of the spoons 12 and extending substantially to the rounded free end 14. As shown in Fig. 1 of the drawing, the inner or upper end of the coil is formed to provide an eyelet or opening 20 for the passage therethrough of the outermost fastener 17 by means of which the inner end of the coil may be fixedly anchored with respect to the spoon 12. At the outer or free end of the coil the wire is formed into a relatively flat helically wound pancake-like portion 21 comprising several turns or convolutions to provide a relatively flat surface or bearing portion at the free end of the device for engagement upon the surface of the turf.

The action of the spoons 12 and turf-retaining devices 18 and the manner in which they engage the turf is illustrated in Figs. 2 to 7, inclusive, of the drawing. Thus, in Fig. 2 and with the apparatus moving from right to left and the circular disk 11 rotating in the counterclockwise direction indicated, there is illustrated the relative position of the spoon 12 and its associated turf-retaining device at the instant the spoon is about to penetrate or enter the turf. As traverse of the apparatus and rotation of the disk 11 continues in the direction mentioned the portion 13 of the spoon 12 moves downwardly into the turf and the bearing portion 21 is engaged upon the surface of the turf surrounding the spoon portion 13 so that the coil 18 is placed under increasing compression, for example as shown in Figs. 3 and 4 of the drawing, and then as travel of the apparatus and rotation of the disk 11 continues further the portion 13 of the spoon 12 moves progressively rearwardly and outwardly to undercut the surface of the turf by a generally arcuate sweep of the spoon portion 13. During this progressive rearward movement of the spoon 12 it is withdrawn progressively from the turf and the coil 18 progressively expands thus gradually decreasing the compression thereof. The spoon 12 finally is withdrawn from the turf leaving an opening therein of the general configuration shown in Fig. 7 of the drawing.

During the interval that the spoon portion 13 is engaged in the turf and the bearing portion 21 of the retaining device 18 bears upon the surface of the turf, the compression forces generated in the coil 18 operate effectively to retain the turf in position and prevent the spoon portion 13 from tearing loose and lifting or raising upwardly a surface layer or section of the turf. Of course, the working compression forces of the coil 18 may vary according to the type and condition of the turf to be cultivated which in turn depends largely upon the type of grass used and the general climatic conditions existing where the turf is located. By way of example however, it may be stated that excellent results have been obtained on bent grass golf greens in the Middle Atlantic States region of the United States with coil devices made according to the present invention and having a working compression force of from about 10 to 12 pounds.

As previously stated, as the spoon portion 13 emerges from the turf it removes small plugs or masses of soil which, prior to the present invention, it has been necessary to break up so that they do not constitute obstacles on the surface of the turf. This usually required an entirely separate operation. In the present invention, however, the combined longitudinal and lateral flexure of the coil 18 relatively with respect to the spoon portion 13 operates very effectively to break up and pulverize these small plugs or masses of soil as they are removed from the turf by the spoon portions 13.

A modification of the construction previously described is disclosed in Fig. 8 of the drawing wherein, in lieu of the integral flat helical winding portion 21 at the outer or free end of the coil 18, there may be substituted a solid annular element in the nature of a washer or the like 22 which may be welded or otherwise secured to the outer end of the coil 18 to provide a bearing surface for engagement with the surface of the turf.

While certain embodiments of the invention have been illustrated and described herein, it is not intended to limit the invention to such disclosure and changes and modifications may be made therein and thereto within the scope of the following claims.

I claim:

1. Cultivating apparatus for aerating and treating grass turf comprising a soil engaging element arranged to engage and penetrate the soil including a narrow elongated soil engaging part having wall portions defining a longitudinally extending trough therein of substantially uniform cross-sectional shape throughout its length to engage and remove an elongated plug of soil from the turf without materially compressing the surrounding turf, and means comprising a coil spring of a plurality of convolutions loosely surrounding the turf engaging part of said element with the upper end of said spring fixedly mounted to the upper end of the element, the coils of the spring extending substantially the entire length of the soil engaging part of the element and the lower end of the spring being engageable with the adjacent turf continuously during engagement thereof by said element to prevent tearing of the turf and to cause the coil spring to be progressively compressed and expanded respectively during movement of the element inwardly and outwardly of the turf thereby causing flexure of the coil relative to the soil engaging part operable to break up the plugs of soil removed thereby from the turf.

2. Cultivating apparatus for aerating and treating grass turf comprising a soil engaging element arranged to engage and penetrate the soil including a narrow elongated soil engaging part having wall portions defining a longitudinally extending trough therein of substantially uniform cross-sectional shape throughout its length to engage and remove an elongated plug of soil from the turf without materially compressing the surrounding turf, and means comprising a coil spring of a plurality of relatively spaced convolutions of substantially uniform diameter loosely surrounding the turf engaging part of said element with the upper end of said spring fixedly mounted to the upper end of the element, the coils of the spring extending substantially the entire length of the soil engaging part of the element and the lower end of the spring being engageable with the adjacent turf continuously during engagement thereof by said element to prevent tearing of the turf and to cause the coil spring to be progressively compressed and expanded respectively during movement of the element inwardly and outwardly of the turf thereby causing flexure of the coil longitudinally relative to the soil engaging part operable to break up the plugs of soil removed thereby from the turf.

3. In cultivating apparatus for aerating and treating grass turf including a wheeled carriage adapted to traverse turf to be cultivated, a plurality of soil engaging elements rotatively movable relative to said carriage and arranged to engage and penetrate the soil, said elements each including a narrow elongated soil engaging part having wall portions defining a longitudinally extending trough therein of substantially uniform cross-sectional shape throughout its length and facing in the direction of movement of the elements relative to the carriage to engage and remove an elongated plug of soil from the turf without materially compressing the surrounding turf, and means comprising a coil spring of a plurality of convolutions loosely surrounding the turf engaging part of each element with the upper ends of said springs fixedly mounted with respect to the upper ends of said elements, the coils of the springs extending substantially the entire length of the soil engaging parts of the elements and having their lower free end portions disposed to engage the adjacent turf substantially continuously during engagement thereof by said elements to prevent tearing of the turf and to cause the coils to be progressively compressed and expanded respectively during movement of the elements inwardly and outwardly of the turf thereby causing flexure of the coils relative to the soil engaging elements operable to break up the plugs of soil removed thereby from the turf.

4. In cultivating apparatus for aerating and treating grass turf including a wheeled carriage adapted to traverse turf to be cultivated, a plurality of soil engaging elements rotatively movable relative to said carriage and arranged to engage and penetrate the soil, said elements each including a narrow elongated soil engaging part having wall portions defining a longitudinally extending trough therein of substantially uniform cross-sectional shape throughout its length and facing in the direction of movement of the elements relative to the carriage to engage and remove an elongated plug of soil from the turf without materially compressing the surrounding turf, and means comprising a coil spring of a plurality of relatively spaced convolutions of substantially uniform diameter loosely surrounding the turf engaging part of each element with the upper ends of said springs fixedly mounted with respect to the upper ends of said elements, the coils of the springs extending substantially the entire length of the soil engaging parts of the elements and having their lower free end portions disposed to engage the adjacent turf substantially continuously during engagement thereof by said elements to prevent tearing of the turf and to cause the coils to be progressively compressed and expanded respectively during movement of the elements inwardly and outwardly of the turf thereby causing flexure of the coils longitudinally relative to the soil engaging elements operable to break up the plugs of soil removed thereby from the turf.

5. In cultivating apparatus for aerating and treating grass turf including a wheeled carriage adapted to traverse turf to be cultivated, a plurality of soil engaging elements rotatively movable relative to said carriage and arranged to engage and penetrate the soil, said elements each including a narrow elongated soil engaging part of uniform concavo-convex substantially semi-circular cross-sectional shape lengthwise thereof and facing in the direction of movement of the elements relative to the carriage to engage and remove an elongated plug of soil from the turf without materially compressing the surrounding turf, and means comprising a coil spring of a plurality of convolutions loosely surrounding the turf engaging part of each element with the upper ends of said springs fixedly mounted with respect to the upper ends of said elements, the coils of the springs extending substantially the entire length of the soil engaging parts of the elements and having their lower free end portions disposed to engage the adjacent turf substantially continuously during engagement thereof by said elements to prevent tearing of the turf and to cause the coils to be progressively compressed and expanded respectively during movement of the elements inwardly and outwardly of the turf thereby causing flexure of the coils relative to the soil engaging elements operable to break up the plugs of soil removed thereby from the turf.

THOMAS C. MASCARO.

REFERENCES CITED

The following references are of record in the file of this patent:

UNITED STATES PATENTS

| Number | Name | Date |
|---|---|---|
| 1,963,054 | Powers | June 12, 1934 |
| 2,021,506 | Hamilton, Sr. | Nov. 19, 1935 |
| 2,229,497 | Dontje | Jan. 21, 1941 |

FOREIGN PATENTS

| Number | Country | Date |
|---|---|---|
| 455,822 | Great Britain | Oct. 28, 1936 |